May 25, 1965   M. A. YOUNG   3,184,998

IMPACT WRENCH WITH STABILIZER HANDLE

Filed July 15, 1963

INVENTOR.
MERRILL A. YOUNG
BY Geo. M. Soule
ATTORNEY

United States Patent Office  3,184,998
Patented May 25, 1965

3,184,998
IMPACT WRENCH WITH STABILIZER HANDLE
Merrill A. Young, Gates Mills, Ohio, assignor to Curtiss-Wright Corporation, a corporation of Delaware
Filed July 15, 1963, Ser. No. 295,111
2 Claims. (Cl. 81—52.3)

Maintenance, repair and rearrangement of parts of assemblies in and on vehicles moving orbitally and otherwise in space externally of the earth's atmosphere (hereinafter space or outer space) will inevitably require accurate and strong manual application of torque to screw threaded fasteners and other screw threaded parts, as for adjustments, and, since the operators will in effect be weightless while in orbit, application of the necessary torque will at least usually require stabilization or reaction-force-absorbing means or measures far beyond the requirements normally accompanying use of hand operated tools. Portable power tools and conveniently usable power sources therefore will probably not for many years be made available for torquing operations as on threaded fasteners in and around space vehicles, and when or if such can be made available the tools will nevertheless present essentially the same stabilization problems as do wholly manually operated tools.

In the expected operations of disassembly and reassembly of components externally of pressurized bodies in space the operations of releasing threaded fasteners will become especially difficult because of the tendency of metals to weld together in vacuum. Thus considerably higher torque capabilities, inter alia, will be required of manually operated tools than are required for use within the earth's atmosphere.

One torque-applying manual tool for use in space-vehicle-maintenance resembles a pair of pliers with adaptation such that conventional angular movement of its handle portions toward each other imparts rotary indexing movement to an output shaft and thence to the threaded fastener members involved; but that tool has no provision other than abutment means for engagement with surfaces adjacent the fasteners (e.g. sockets in the vehicle framework) for enabling the necessary absorption of reaction forces.

I have discovered that an already known manual impact wrench mechanism as one example (presently sold under the trade mark SWENCH by the assignee of this application) can be augmented for use as in outer space by simple stabilizing means whereby its effectual operations on threaded fasteners, accurately and powerfully to tighten them, and to loosen them when "frozen," requires no means externally of the operator's body to absorb the torque reaction forces but only a moderate amount of training and muscular coordination.

In accordance with the invention, there is provided a manual impact wrench having an operating handle and a stabilizer handle, the stabilizer handle being mounted to pivot on the axis of the toolhead of the wrench in the plane of angular movement of the operating handle and enabling the transfer of reaction forces to a threaded fastener. The stabilizer handle may be provided with a rigid stabilizer adjunct for application to structure relatively fixed with respect to the fastener.

Embodiments of the present invention, the principal object whereof is indicated above have, in addition to use in space, important utility as in submarine repair and demolition work by deep sea divers and "frogmen" and in situations such that the operators involved can or must be suspended more or less unstably as on slings or free floating (e.g., buoyant) devices in order to reach the work involved. The invention is of course applicable to manual impact tools of various designs and types other than SWENCH.

Other objects and novel features of the present invention will become apparent from the following description of a typical embodiment as shown in the accompanying drawing, wherein.

Figure 1:
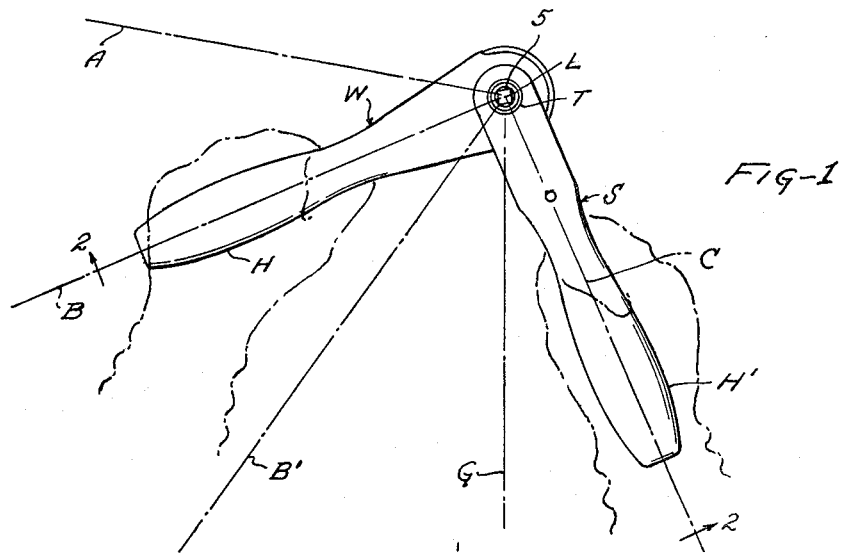
FIG. 1 is a small scale plan view of the present subject tool with diagrammatic (broken line) indications of its use.

The present subject tool as shown in FIG. 1 includes the impact wrench unit W, assumed to be applied to a threaded fastener not shown disposed in axial alignment with the center or working axis L of a rotary output shaft or toolhead member T (FIG. 2) of the wrench. The toolhead has two oppositely projecting square or non-circular drive stubs 5 and 5' adapted to be detachably coupled with the fasteners through any suitable detachable socket devices not shown. Wrench mechanism W as partially illustrated herewith is substantially that disclosed in the U.S. patent of Oscar J. Swenson No. 3,108,506 issued October 29, 1963.

Impact Wrench W

Figure 2:
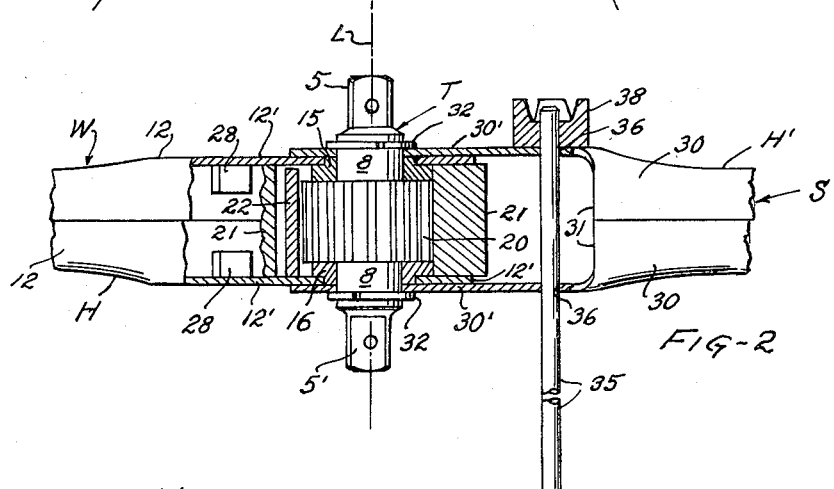
FIG. 2 is a fragmentary cross-sectional view taken along the line 2—2 on FIG. 1.
Figure 3:
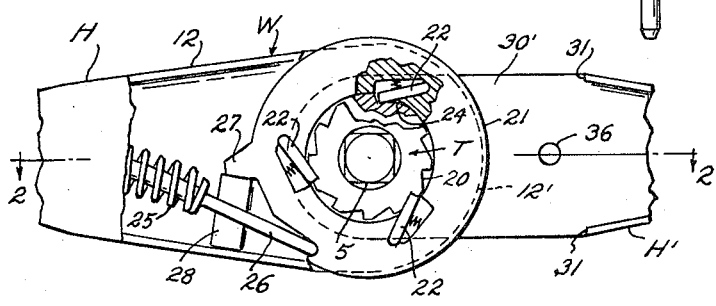
FIG. 3 is a fragmentary plan view partly broken away showing principal portions of the preferred impact producing mechanism.

The illustrative impact wrench mechanism as shown at the left in FIGS. 2 and 3 comprises a handle-constituting main body H formed of complemental unitary sheet metal half shells 12 on which the toolhead T is supported as in bearing bushings 15 and 16 rigid with respective parallel side plate portions 12' of the shell member 12. The aligned drive stub portions 5 and 5' of the toolhead T are integral extensions of identical circular shaft portions 8 which turn freely in the bearing bushings. Around and turnable freely on external peripheral surface portions of the bushings 15 and 16 is an annular metal rotor or inertia or hammering member 21.

The inertia member 21 closely surrounds a ratchet toothed portion 20 of the toolhead T, and pawls 22 in cavities formed in the rotor body are biased by suitable springs for impact producing engagement with the ratchet teeth. Three cams 24 (one shown in FIG. 3) formed on the bushings 15 and 16 for movement with the handle H are operable against the pawls as a function of predetermined angular movement of the handle H and rotor 21 about the toolhead axis L in a predetermined direction to enable escapements and impacts between the pawls and ratchet teeth pursuant to somewhat more than 30 degree indexing or continuous movements of the handle H with reference to a fastener coupled with the toolhead T.

A helical power spring 25 FIG. 3 disposed within the handle H lengthwise thereof is supported at one end (not shown) in the handle H, and the illustrated end operates on the rotor 21 eccentrically thereof, e.g., via a pushrod 26 supported as shown by associated portions of the power spring and of the rotor 21. Initially a lug 27 of the rotor rests against stops 28 rigid with the handle H; and a predetermined relative movement of the handle and rotor 21 about the toolhead, assuming it is incapable of free rotation, will, pursuant to the cam-compelled escapements, produce the impacts through energy alternately stored in and released by the power spring 25.

Stabilizer S

The handle H' of stabilizer S, as more or less evident from the drawing, may be formed of suitably rigidly joined metal half shell members 30 with parallel side plate extensions 30' beyond cut back or edge surfaces 31 on each side, FIGS. 2 and 3, the side plate portions 30' having aligned openings for swivel connection with the wrench handle H as on the circular portions 8 of the toolhead T. The half shells 30 of handle H' can thus be basically identical with the half shells 12 of wrench handle H except for the clearance affording edge portions at 31 which allow the two handles H and H' to be relatively swung about the connecting pivot through the greater part of a complete circumference. As shown in FIG. 2 the mutually overlapping side plate portions 12' and 30' are held in assembled relationship by snap rings 32 in suitable grooves in the toolhead portions 8. The half shells 30 can be held rigidly together remotely of the toolhead by any suitable means not shown. The clearance provided by the disposition of edge portions 31 permits the handles H and H' to be held by either hand of the operator both for fastener-loosening and fastener-tightening operations, whichever he finds the more convenient or suited to his muscular coordination, aptitude or habits.

*Operation*

As shown in FIG. 1 the handle portion H of impact wrench W is disposed along axis B intersecting axis L preparatory to having torque applied thereto manually in a counterclockwise direction about the axis L for storing force in the power spring 25. The left hand of the operative is shown diagrammatically in a typical position for applying such torque to a fastener for loosening it if it has right hand screw threads. If more than one impact per single operation is desirable or there is room for its accomplishment then the initial position of the handle H would be along axis A for example. The handle H' of stabilizer device S is held approximately in the manner indicated by broken lines along an axis C intersecting axis L and displaced to the right of axis G which partially defines a plane approximately coincident with the center of gravity of the operator. Axis B', coplanar with axes A, B and C, indicates approximately the terminal movement of the wrench handle H from axis B toward axis G in producing one impact on the fastener.

The position of the stabilizer handle H', as along axis C, will usually remain fixed with relation to the body of the operator and to the fastener axis L during manual, power-spring-cocking, movement of the handle H as from axes A or B to and past axis B' but may be moved relatively small amounts as governed more or less instinctively by the muscular equipment and skill of the operator in serving to balance the increasing forces and changing directions involved in movement of the wrench handle H, thereby to maintain the torso of the operator approximately immovable in the plane of axis G. In the particular fastener-loosening operation intended to be illustrated in FIG. 1 the operator will usually steady his forearm against his body via his space suit with his forearm directed generally toward the axis L; and the principal forces involved in stabilizing the body of the operator against displacement will be concentrated on that axis. The forces being applied to stabilizer handle H' are quickly diminished nearly to zero by the operator when the wrench handle H arrives at the position B' or wherever the final impact per operation occurs. No appreciable readjustment of stabilizing forces on handle H' has been found necessary during quickly accomplished successions of impacts, e.g., as at axis B in going from A to B'.

In tightening a right hand threaded fastener, the tool is simply inverted, with or without changing the relationship of right and left hands on the handle portions H and H', and the socket or adapter position will of course be reversed as usual, e.g., from stub 5' to stub 5 FIG. 2. Thereupon the handle H is moved as from axis B' toward axes B or A to store force in the power spring and escapement mechanism, whereupon the principal stabilizing forces applied by the operative to the handle H' will simply be reversed in relation to the previously described application for loosening of a fastener. If the tool is inverted and also reversed left to right then the fastener-tightening operations would be properly depicted by a mirror image of FIG. 1 (operation of operator's right hand on the wrench handle H then being clockwise).

Stabilizing adjuncts can of course be used with the present tool for application to the framework or other support around the fastener when the framework has suitable cooperating abutment surfaces. One such adjunct is shown in FIG. 2 in the form of a rod 35 slidable in aligned openings 36 in the plate portions 30' of handle H' and adapted to abut a properly disposed steadying surface as of a socket. The rod as shown has a head 38 preferably of strongly magnetic material by which, as in FIG. 2 the rod is stably held for carrying purposes against the adjacent plate portion 30' assuming it is of magnetic material. If the block 38 is placed against a magnetic surface in the vicinity of the fastener being operated upon, it alone can have considerable augmenting stabilizing effect in the operation of the tool. The rod 35 can have any suitable friction detent (not shown) on the handle H' to prevent too easy or undesired movement in the openings 36.

I claim:

1. In combination with a manual impact wrench having a rotary toolhead, an operating handle supporting the toolhead and extending therefrom transversely of its working axis, said wrench having a power spring and cam-operated escapement mechanism capable of imparting successive unidirectional rotary impacts to the toolhead when the toolhead is torque-connected to a threaded fastener and the handle is moved back and forth through a predetermined angle about the axis of the toolhead, the improvement comprising a stabilizer handle mounted on the wrench to pivot on the axis of the toolhead and extending therefrom transversely of said axis in the plane of angular movement of the operating handle.

2. In combination with a manually operated impact wrench having a rotary toolhead and a supporting body therefor including a handle projecting transversely of the rotational axis of the toolhead, the toolhead and handle having cooperating power-spring-operated escapement means arranged to impart impacts to the toolhead, a stabilizer handle freely pivotally connected with the wrench about the axis of the toolhead and extending transversely of said axis, and a rod thereon and projecting therefrom transversely of the plane of movement of the wrench handle about said toolhead axis for abutting engagement with a cooperating relatively fixed surface generally adjacent the fastener to be tightened or loosened, said rod having a permanently magnetic head portion.

References Cited by the Examiner

UNITED STATES PATENTS

| | | | |
|---|---|---|---|
| 439,388 | 10/90 | Cushman | 81—54 |
| 748,018 | 12/03 | Rowe | 81—54 X |
| 755,569 | 3/04 | Freeland | 81—61 |
| 773,050 | 10/04 | Byers | 81—61 X |
| 877,571 | 1/08 | Larson | 81—57 |
| 965,929 | 8/10 | Paulson | 81—121 |
| 1,024,151 | 4/12 | Smith. | |
| 2,621,688 | 12/52 | Wales | 81—58.1 X |
| 3,108,506 | 10/63 | Swenson | 81—52.3 |

WILLIAM FELDMAN, *Primary Examiner.*